(12) United States Patent
Sylvester

(10) Patent No.: US 7,826,837 B1
(45) Date of Patent: Nov. 2, 2010

(54) SYSTEMS AND METHODS FOR TRACKING SIGNAL STRENGTH IN WIRELESS NETWORKS

(75) Inventor: James E. Sylvester, McLean, VA (US)

(73) Assignee: Verizon Services Corp., Ashburn, VA (US)

( * ) Notice: Subject to any disclaimer, the term of this patent is extended or adjusted under 35 U.S.C. 154(b) by 940 days.

(21) Appl. No.: 11/198,548

(22) Filed: Aug. 5, 2005

(51) Int. Cl.
*H04W 24/00* (2009.01)
(52) U.S. Cl. ...................... 455/423; 713/310
(58) Field of Classification Search ............... 455/69, 455/522, 404.2, 405, 407, 414.2, 422.1, 432.1, 455/67.14, 67.11, 115.3
See application file for complete search history.

(56) References Cited

U.S. PATENT DOCUMENTS

| | | | |
|---|---|---|---|
| 5,390,365 A | 2/1995 | Enoki et al. | |
| 5,982,324 A | 11/1999 | Watters et al. | |
| 6,236,359 B1 | 5/2001 | Watters et al. | |
| 6,282,427 B1* | 8/2001 | Larsson et al. | 455/456.2 |
| 6,323,803 B1 | 11/2001 | Jolley et al. | |
| 6,567,670 B1* | 5/2003 | Petersson | 455/522 |
| 6,697,103 B1 | 2/2004 | Fernandez et al. | |
| 6,799,046 B1 | 9/2004 | Tang | |
| 6,876,890 B1* | 4/2005 | Oleniczak | 700/65 |
| 2002/0077115 A1* | 6/2002 | Ruutu et al. | 455/456 |
| 2002/0115445 A1* | 8/2002 | Myllymaki | 455/456 |
| 2003/0028803 A1* | 2/2003 | Bunker et al. | 713/201 |
| 2005/0043042 A1* | 2/2005 | Hwang et al. | 455/456.2 |
| 2005/0136911 A1* | 6/2005 | Csapo et al. | 455/423 |
| 2006/0183487 A1* | 8/2006 | Allen et al. | 455/456.5 |

OTHER PUBLICATIONS

Clements, Tom, Making Sense of Cellular, http://developers.sun.com/techtopics/mobility/getstart/articles/radio/, Jul. 2002, p. 1-6.
Stingray, System-In-Package a-GPS, Industry Leading Signal Sensitivity, Lower Power Consumption and Small Footprint, www.globallocate.com, p. 1-2, 2005.
ApexScales.com, GPS, Cellular & Wireless Systems, http://apexscales.com/gps-wireless-systems.htm, p. 1-4, 2005.
EAP, Employer's Asset Protection, Real-Time Vehicle Tracking System, http://eaprotection.com/gpstrack/pgs_cellular_tracking_system.htm, p. 1-2, 2005.
GENEQ, Cellular Tracking System, Model Pro Trak-GPS, http://geneq.com/catalog/en/pgs_cell_track_sys.html, p. 1-3, 2005.

* cited by examiner

*Primary Examiner*—Tu X Nguyen

(57) ABSTRACT

Tracking of signal strength in wireless networks is disclosed. In one of many possible embodiments, signal strength of a wireless signal received by at least one wireless device is measured, the wireless device being configured for operation in the wireless network. A parameter of the wireless device is determined, the parameter corresponding with the measurement of signal strength. The measured signal strength and the determined parameter are transmitted to a network operations center. The measured signal strength and the determined parameter are used to analyze signal coverage of the wireless network.

34 Claims, 5 Drawing Sheets

SYSTEMS AND METHODS FOR TRACKING SIGNAL STRENGTH IN WIRELESS NETWORKS

BACKGROUND INFORMATION

Wireless networks typically include signal transmitting antennae geographically positioned in a manner designed to provide contiguous signal coverage over a geographic service area. For example, cellular networks are generally organized into cells, with each cell having at least one antenna capable of transmitting radio frequency ("RF") signals over a particular section of the service area. The cells of the network are positioned to provide cellular coverage over the geographic service area, such as the territory occupied by a city.

Each cell is assigned a particular range of radio frequencies within a predetermined cellular band. Because an antenna of a cellular network transmits at relatively low power, the radio frequencies transmitted by the antenna are for the most part restricted to its corresponding cell. This allows the limited number of frequencies within a cellular band to be reused by different cells within a cellular network. As a result, cellular networks are able to support large numbers of active cellular devices. Overlap between reused radio frequencies is avoided by ensuring that no two immediately adjacent cells are assigned common radio frequencies.

Because cellular signals of a cellular network are transmitted using RF signals, the extent of effective coverage provided by a cellular network can be affected by many different influences. For example, the effective range of RF signals may be undesirably compromised by geographic features such as mountains, canyons, buildings, and weather conditions. Consequently, cellular reception may be weak, or even nonexistent, at some locations (e.g., in a basement of a building) within a cellular network. Moreover, many other circumstances may undesirably attenuate or interfere with cellular RF signals. For example, other radio signals or radiation produced by other sources may interfere with cellular signals.

Because numerous possible static and dynamic factors may affect RF signals as they travel through a cellular network, it is extremely difficult for network designers to predict the strength of the RF signals at every location within the cellular network. As a result, cellular customers often experience "dead spots" within cellular networks. Dead spots refer to locations within a cellular network that do not receive an effective cellular signal. The cellular signal may be either weak or nonexistent at a dead spot in the cellular network. Dead spots may cause cellular callers to experience interrupted telephone connections, unclear or unintelligible telephone conversations, and failures to establish connections. These experiences may lead the carrier of a cellular network to lose both business and goodwill among customers.

When dead spots are identified, network operators are able to attempt to eliminate them by making adjustments to cellular antennae or transmitters. In the past, cellular network operators have employed several approaches for discovering dead spots in cellular networks. For example, one traditional approach is to rely upon cellular customers to report dead spots. This approach tends to be less than effective because customers may not travel to all locations within a network. Moreover, customers may be either unable to identify the precise location at which a dead spot was experienced or not motivated to go to the trouble of reporting the dead spot.

Other conventional approaches for locating dead spots are labor intensive, time consuming, and not always accurate. For example, many cellular network operators hire employees to travel throughout cellular networks with specialized equipment capable of measuring the availability and strength of cellular signals. Not only is the specialized equipment costly, manual sampling of signal strength requires vast amounts of manpower to cover a dynamically changing grid of cellular signals. Moreover, it may be extremely difficult, if not impossible, for employees to sample signal strength from every possible location within a cellular network.

Recently, there has been an increase in the number of wireless communications devices (e.g., cellular telephones) that are equipped with global positioning system ("GPS") technologies. By using GPS technologies, a cellular telephone is able to determine its location according to GPS coordinates. Other approaches have also been introduced for identifying the current location of a cellular telephone within a cellular network. For example, principles of trilateration have been used to evaluate cellular signals originated from a cellular telephone in order to estimate its location. However, none of the existing approaches for locating cellular telephones within a cellular network has been used for tracking, analyzing, and managing signal strength within a cellular network (e.g., in locating and correcting dead spots). Rather, existing approaches have been designed primarily for use with emergency 911 telephone calls so that the location of a cellular telephone originating a 911 telephone call may be identified and potentially used in providing timely emergency aid.

In sum, existing approaches for tracking signal strength in wireless network are time-consuming, labor-intensive, costly, and less than effective for precisely identifying all dead spots in wireless communication networks. Consequently, wireless carriers often experience frustration in trying to track and eliminate dead spots. Moreover, because existing approaches are less than effective, carriers often suffer losses of business and goodwill due to subscribers experiencing the inconvenience and frustration typically associated with the undesirable effects caused by dead spots in wireless networks.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Overview

Figure 1:
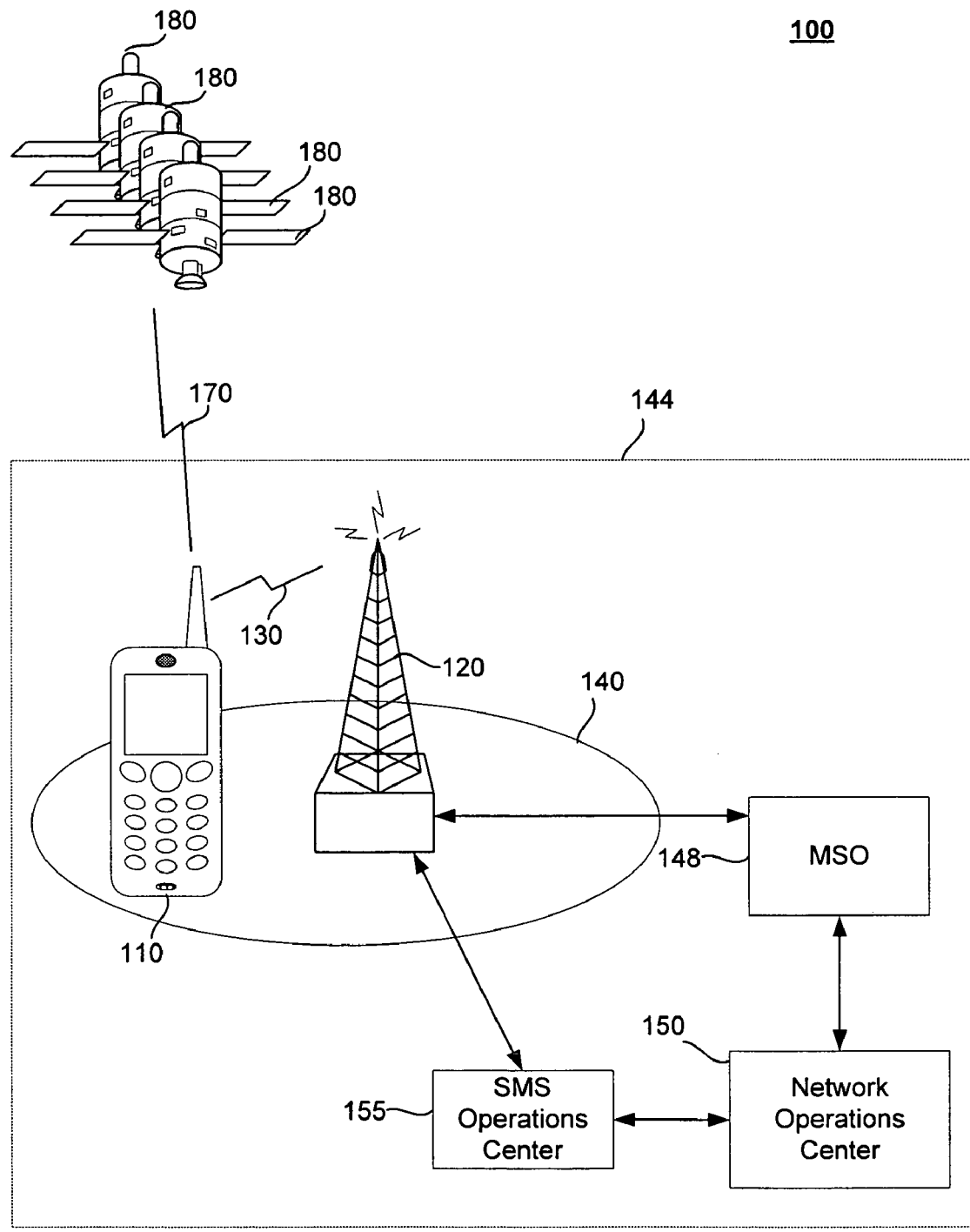
FIG. 1 is a block diagram illustrating an example of a wireless network management system, according to one embodiment.

Preferred embodiments according to the present invention may be implemented as systems and methods for tracking downstream wireless signal strengths in wireless networks.

More specifically, the described systems and methods (collectively the "system") provide for the use of parameter data (e.g., location data, time data) to track signal strength within wireless networks. At least one positioning technology (e.g., GPS technology) other than wireless network positioning technologies (e.g., cellular network trilateration techniques) may be used to identify parameters (e.g., location, time, and/or velocity) of wireless devices configured to operate in the wireless network.

Wireless devices (e.g., cellular telephones) within a wireless network may be configured to measure the strength of received wireless network signals transmitted from wireless access points (e.g., base stations) used in the network. For certain measured signal strengths, corresponding parameter data (e.g., location and time data) is obtained by the wireless devices at approximately the same time that the signal strengths are measured. The parameter data may be obtained using a positioning technology that is independent of the wireless network, such as GPS technology. Parameter data may include any information useful for identifying location, time, and/or velocity coordinates of wireless devices at approximately the same time that signal strengths are measured. The parameter data is associated with the measured signal strengths so that the signal strength and parameter data may be used together to track signal strength measurements within wireless networks. Wireless devices may be configured to transmit the signal strength measurements and parameter data to a central location (e.g., a network operations center) via the wireless network. These transmissions can be periodic, in response to a request, or upon reaching a threshold signal level. The transmissions can take advantage of "out-of-band" portions of the wireless network in order to avoid bandwidth reductions in traffic-bearing channels.

The system is able to use collected signal strength and parameter data to analyze and optimize configurations of wireless networks. For example, measured signal strength may be plotted on a geographic representation (e.g., a map) of the wireless network. Measured signal strength may also be plotted based on time. Regardless of the form of output generated, the system is able to provide network operators with up-to-date and accurate network data useful for analyzing, planning, configuring, and optimizing wireless networks. Among other benefits, the system allows network operators to find and eliminate dead spots quickly and cost-effectively within wireless networks. For example, network operators may be able to reconfigure or optimize signal coverage of the territories served by the wireless networks. In some embodiments, wireless networks may be automatically reconfigured or optimized as a result of the analysis. Network operators may also be able to identify faulty or failing antennae and schedule them for repair. Additionally, the system allows network operators to identify locations and/or times at which the wireless network is congested. Network operators can then perform steps to alleviate the congestion. Consequently, the carrier can provide subscribers with comprehensive signal coverage.

II. Introduction of Elements

FIG. 1 is a block diagram illustrating an example of a wireless network management system 100 (also referred to simply as "the system 100"), according to one embodiment. As shown in FIG. 1, a wireless device 110 communicates with a base station 120 by way of wireless network signals 130. The wireless device 110 and base station 120 are located within a cell 140, which is part of a wireless network 144. The base station 120 is communicatively coupled to a mobile switching office ("MSO") 148, which is communicatively coupled to a network operations center 150. The base station 120 may also be communicatively coupled to a short message service ("SMS") operations center 155, which is communicatively coupled to the network operations center 150. The various communicative couplings may be established by any of a number of well-known connections, such as wireless connections provided by the wireless network 144 and/or known forms of landline connections.

As further shown in FIG. 1, the wireless device 110 is configured to receive global positioning system ("GPS") signals 170 from GPS satellites 180, but other forms of GPS transmitters (e.g., land-based) can also be used. In many embodiments, the wireless network 144 is in the form of a cellular network. Each of the components of the system 100 will now be described in detail.

While an exemplary application of the system 100 is shown in FIG. 1, those skilled in the art will recognize that the exemplary components illustrated in the Figure are for purposes of illustration and not intended to be limiting. Indeed, those skilled in the art will recognize that other alternative hardware environments may be used in other embodiments.

A. Wireless Network

The wireless network 144 may be in the form of a wide variety of different types of wireless networks. More specifically, the wireless network 144 may include any suitable wireless technology that enables wireless communication between the wireless device 110 and the base station 120. For example, the wireless network 144 may use radio signals, infrared signals, and other forms of wireless communications signals.

In many embodiments, the wireless network 144 uses radio frequency ("RF") transmissions to support communications between the wireless device 110 and the base station 120. For example, the wireless network 144 may be in the form of a cellular network, which is one example of a wireless network that communicates using RF signals.

The wireless network 144 may employ any known cellular network technologies. For example, the wireless device 110 and the base station 120 may communicate using any of an assigned subset of radio frequencies within one or more cellular bands, which bands are typically defined by governmental regulations. For example, the wireless network 144 may be configured to use analog cellular signals for communications with the wireless device 110. In this case, one known wireless network 144 may be configured to operate using any of eight hundred and thirty two (832) different radio frequencies within a cellular band. A subset (e.g., forty-two) of the eight hundred and thirty two frequencies of the known network may be reserved as control channels. As known to those skilled in the art, control channels may be used for telephone call setup and cell-switching, to name just two of many possible uses.

The remaining seven hundred and ninety (790) frequencies, commonly known as communication channels, can be used to carry voice and data signals. Because two frequencies are used for a two-way voice/data connection between a particular wireless device 110 and the base station 120, the wireless network 144 is capable of supporting three hundred and ninety five (395) different analog voice channels.

However, as those skilled in the art will appreciate, the wireless network 144 may employ frequency reuse and digital transmission technologies to support significant numbers of telephone calls in excess of the number of available analog voice channels. In an exemplary embodiment, for example, code division multiple access ("CDMA") technology is used for transmissions of cellular signals between the base station 120 and the wireless device 110. Other embodiments of the system 100 may use different cellular technologies, including time division multiple access ("TDMA"), global system for mobile communication ("GSM"), advanced mobile phone service ("AMPS"), and other known cellular transmission technologies.

In addition, the wireless network 144 may be configured to support any known out-of-band communications technologies for communication with the wireless device 110. For example, the wireless network 144 may employ short message service (SMS) technology, which is an out-of-band low-bandwidth message transfer protocol for sending short alphanumeric messages to and from the wireless devices 110. As discussed below, the SMS out-of-band protocol may be used to track signal strength and GPS data associated with the wireless device 110.

While FIG. 1 shows the wireless network 144 as including a single wireless device 110 and a single base station 120 as part of a single cell 140, this is merely for purposes of illustration and not intended to be limiting. The wireless network 144 may include multiple wireless devices 110 and base stations 120. For example, multiple wireless devices 110 may concurrently communicate with one or more base stations 120. Moreover, as those skilled in the art will appreciate, the wireless network 144 may include multiple cells 140 positioned to provide coverage across the wireless network 144.

1. Wireless Device

The wireless device 110 may include any device capable of communicating with the base station 120 by way of wireless network signals 130. Accordingly, the wireless device 110 may employ wireless communications technologies and components such as, but not limited to, radio frequency (RF) tuners, transceivers, analog-to-digital converters, digital-to-analog converters, upconverters, downconverters, signal modulators, filters, amplifiers, attenuators, antennae, encoders, decoders, multiplexers, demultiplexers, and signal processors. The wireless device 110 may include analog and/or digital signal transmission capabilities.

The wireless device 110 may be in the form of a cellular telephone, a personal digital assistant, a laptop computer, desktop computer, wireless network interface card, personal computer, dedicated computer device, gaming station, wireless e-mail enabled device, satellite pager, wireless internet device, embedded computer, video phone, mainframe computer, mini-computer, programmable logic device, vehicle, entertainment device, and other devices that may not yet exist.

The wireless device 110 may include a unique identifier (e.g., a serial number) and any other information that allows the wireless network 144 to identify characteristics of the wireless device 110 (e.g., make, model, modes, etc.), as well as the subscriber associated with the wireless device 110. For example, the wireless device 110 may include a subscriber identity module ("SIM"), which is well-known to those skilled in the art.

The wireless device 110 may include capabilities for monitoring and determining the strength of received wireless network signals 130. For example, the wireless network signals 130 may comprise RF signals in a cellular band, and the wireless device 110 may be equipped with hardware (e.g., an arrangement of diodes) and/or computing instructions that enable it to measure the signal strength of the downstream RF signals being received. Signal strength may refer to the power (i.e., intensity) of the wireless network signals 130 received by the wireless device 110.

Any known technique for measuring the strength of the wireless signals 130 may be used. For example, the wireless device 110 may be configured to determine downstream signal strength using techniques disclosed in either U.S. Pat. No. 6,799,046 to Tang, issued Sep. 28, 2004, and entitled METHOD AND SYSTEM FOR LOCATING A MOBILE TELEPHONE WITHIN A MOBILE TELEPHONE COMMUNICATION NETWORK or U.S. Pat. No. 5,390,365 to Enoki et al., issued Feb. 14, 1995, and entitled RADIO COMMUNICATION APPARATUS HAVING A RECEIVED SIGNAL STRENGTH MEASURING FUNCTION, the contents of which are hereby incorporated by reference in their entirety.

The wireless device 110 may be configured to measure signal strength continuously, periodically according to a predefined schedule, or in response to an occurrence of a predefined event. For example, the wireless device 110 may be configured to measure signal strength at the initiation of a telephone call and/or throughout the duration of the telephone until the telephone call is disconnected. By way of another example, the wireless device 110 may measure the signal strength of the received wireless signals 130 in response to a command initiated by either the user of the wireless device 110, a network operator, or another device connected to the wireless network 144 (e.g., the base station 120, the MSO 148, the SMS operations center 155, or the network operations center 150). For example, the network operations center 150 may initiate a command signal or "ping" that is sent over the wireless network 144 to the wireless device 110 and is recognized by the wireless device 110 as a request for GPS data. The "ping" command may be transmitted to all or a subset of the wireless devices 110 in the wireless network 144 to allow sampling of the wireless devices 110. In a cellular embodiment of the system 100, the "ping" may be transmitted to the wireless device 110 over one or more control channels of the wireless network 144.

The wireless device 110 may further include non-cellular-based positioning technologies such as GPS capabilities. For example, the wireless device 110 may include a GPS antenna, receiver, amplifier, downconverter, filter, analog-to-digital converter, digital signal processor, and the like for processing GPS signals 170 received from GPS satellites 180. The GPS capabilities may be either external to or built in the wireless device 110. For example, the wireless device 110 may be equipped and interfaced with a GPS receiver (not shown) known to those skilled in the art. The GPS receiver should preferably be configured to minimize consumption of the power of the wireless device 110.

From the GPS signals 170, the wireless device 110 is able to determine GPS data (e.g., GPS location, time, and velocity coordinates), as known to those skilled in the art. The wireless device 110 may be configured to determine GPS data continuously, periodically in accordance with a predefined schedule, or in response to an occurrence of a predefined event. For example, the wireless device 110 may be configured with instructions defining a GPS data gathering schedule. The schedule may be designed by network operators to sample GPS data at specific times that may be helpful for a particular network analysis application.

Other approaches may direct the wireless device 110 to gather GPS data in response to one or more predefined events. Predefined events may include initiation of a telephone call by a user of the wireless device 110 and/or measured signal strength being determined to be lower than a predetermined threshold. For example, when the wireless device 110 determines that measured signal strength is lower than a predetermined threshold, GPS data will be determined from the GPS signals 170.

Other predefined events may include the reception of a command initiated either by the user of the wireless device 110, a network operator, or another device connected to the wireless network 144 (e.g., the base station 120, the MSO 148, the SMS operations center 155, or the network operations center 150). For example, the user of the wireless device 110 may issue a command when signal strength is noticeably low. By way of another example, the network operations center 150 may initiate a "ping" that is sent over the wireless network 144 to the wireless device 110 as a request for GPS data. The "ping" command may be transmitted to all or a subset of the wireless devices 110 in the wireless network 144 to allow sampling of the wireless devices 110. As mentioned above, the "ping" may be transmitted to the wireless device 110 over one or more control channels of the wireless network 144.

Because different triggers may be defined to initiate the obtaining of signal strength and/or GPS data, the system 100 is highly flexible as to when signal strength and/or GPS data is gathered. A network operator may configure the system 100 to gather signal strength and/or GPS data in a manner suited for a particular application. For example, if conservation of the power of the wireless device 110 is a priority, the system 100 may be configured to periodically initiate processes for gathering signal strength and/or GPS data. By way of another example, a network operator may configure the system 100 to gather GPS data for low-power wireless signals 130 having values below a predetermined threshold. Alternatively, the network operator may configure the system 100 to gather GPS data for both conforming and low-power wireless signals 130.

The non-cellular-based technology or technologies of the wireless device 110 may be used as primary or backup parameter-determining technologies. For example, the wireless device 110 may be capable of using cellular-based (e.g., trilateration techniques) and non-cellular-based techniques (e.g., GPS) to determine its location. The position-determining technologies may be configured as primary and backup technologies so that if GPS data is not available due to lack of an adequate GPS signal 170, for example, the wireless device 110 may switch to a cellular-based trilateration technique to determine its location. The wireless device 110 typically includes capabilities for determining its parameters, such as location, time, and/or velocity coordinates, using at least one non-cellular based positioning technology.

The wireless device 110 is able to associate measurements of signal strength of the wireless network signals 130 with corresponding GPS data. In particular, when the wireless device 110 measures signal strength, the wireless device 110 may obtain and use GPS signals 170 to determine GPS coordinate data values that correspond with the measured signal strength. The wireless device 110 may then combine the signal strength with the GPS data to form network status data.

The network status data may include any GPS data (e.g., position, time, and velocity coordinates) and wireless signal strength measurements. In addition, the wireless device 110 may insert other information in the network status data. For example, characteristics of the wireless device 110 (e.g., make, model, etc.) may be included in the network status data. Any other information related to the subscriber or the service plan associated with the wireless device 110 may be inserted into the network status data.

The wireless device 110 may transmit the network status data to the base station 120 using any suitable upstream wireless network signals 130. In cellular embodiments, for example, cellular RF channels (e.g., control channels or communication channels) may carry the network status data from the wireless device 110 to the base station 120. The upstream transmissions may occur in the background by using one or more control channels of the wireless network 144. In another approach, the wireless device 110 may transmit the network status data upstream using an out-of-band protocol such as SMS protocol. In yet another approach, the wireless device 110 may use communication (i.e., data) channels to form a telephone call connection (one-way or two-way) over which the network status data may be transmitted. This may be performed transparently to the user of the wireless device 110.

The network status data may be transmitted in real time or after some delay. For example, if the signal strength of the wireless signals 130 is not strong enough to reliably support immediate transmission, the wireless device 110 may store the network status data to memory (not shown) for subsequent transmission to the base station 120.

Figure 5:
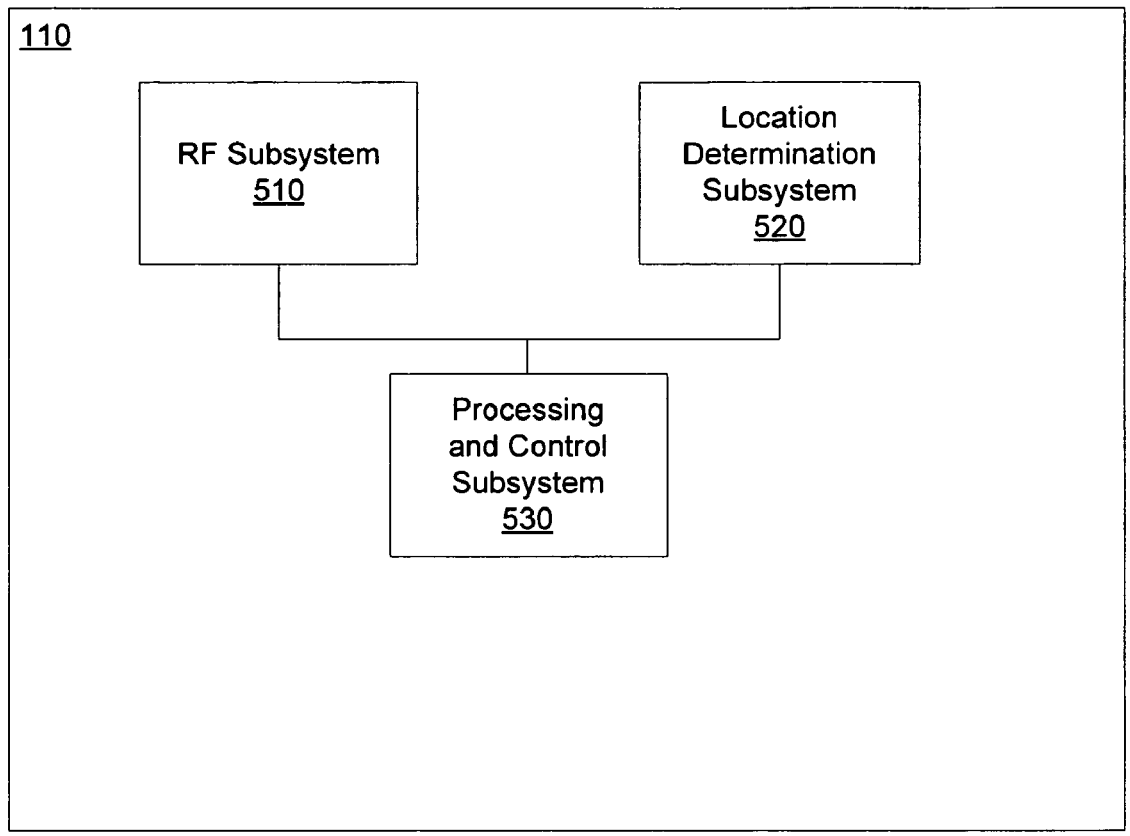
FIG. 5 is a block diagram of an exemplary wireless device, according to one embodiment.

FIG. 5 illustrates an example of a wireless device 110 which may implement the preferred embodiments described herein. Wireless device 110 includes an RF subsystem 510, which may include various components configured to perform transmission and reception of radio-frequency signals over a wireless network. Location detection subsystem 520 may also be provided in wireless device 110. The location determination subsystem 520 includes components configured to determine a location of the wireless device. As noted above, these components may include GPS receiver components. Wireless device 110 also includes a processing and control subsystem 530, which is communicatively coupled to both RF subsystem 510 and location detection subsystem 520. Processing and control subsystem 530 includes components configured to implement the processing of signals received/transmitted by wireless device 500 in the analog and/or digital domains, and to perform the other processing activities required to implement the capabilities described herein. Processing and control subsystem 530 further includes components configured to implement control signaling with the RF subsystem 510 and location determination subsystem 520. As the wireless device illustrated in FIG. 5 is merely exemplary, other subsystems may be present in actual wireless devices that are not depicted in FIG. 5, without impacting the implementation of the preferred embodiments described herein. Furthermore, each of the subsystems 510, 520 and 530 described in the example wireless device shown in FIG. 5 may be implemented in one or more hardware and/or software components, such as those described above, as is known.

2. Wireless Network Signals

The wireless network signals 130 carry data between different devices of the wireless network 144. In particular, the wireless network signals 130 are used to transmit data between the wireless device 110 and the base station 120.

The wireless network signals 130 may be in any format capable of carrying data over a wireless medium and between the different devices interconnected by the wireless network 144. For example, the wireless network signals 130 may be in the form of RF signals. In cellular embodiments of the system 100, for example, the wireless network signals 130 may include RF signals in one or more predefined cellular RF bands, as mentioned above.

The wireless network signals 130 preferably support two-way transmission of data between the wireless device 110 and the base station 120. For example, the wireless network signals 130 may include RF waves of different frequencies, with a first subset of the RF waves carrying downstream signals and a second subset of the RF waves carrying upstream signals. Accordingly, communication (e.g., voice and data) and control signals may be transported simultaneously between the wireless device 110 and the base station 120 in both upstream and downstream directions.

3. Base Station

The base station 120 is configured to transmit and receive the wireless network signals 130 to and from the wireless device 110. The base station 120 may include any network access point. For example, the base station 120 may include a wireless gateway, switch, bridge, or router. In many embodiments, the base station 120 includes an RF transceiver and at least one antenna capable of transmitting and receiving RF signals. In cellular-base embodiments, for example, the base station 120 may include any known technologies employed in cellular network base stations for transmitting and receiving cellular signals.

The base station 120 includes logic for controlling the wireless network signals 130 transmitted to the wireless device 110, including any preprocessing of data for wireless transmission. For example, the base station 120 may select specific frequencies to be used for specific communications with specific wireless devices 110.

4. Cell

As shown in FIG. 1, the cell 140 includes at least one base station 120 and at least one wireless device 110. The cell 140 is defined as a geographic region within which the wireless signals 130 are effectively transmitted and received to and from the base station 120 by the wireless device 110. When the wireless device 110 is within the geographic area of the cell 140, the base station 120 of the cell 140 may establish communications with the wireless device 110 by way of the wireless signals 130.

While FIG. 1 shows a single cell 140, this is for purposes of illustration. As will be appreciated by those skilled in the art, the wireless network 144 may include multiple cells 140 arranged to provide wireless signal coverage across the geographic area covered the wireless network 144.

5. Mobile Switching Office

A mobile switching office ("MSO") 148 is communicatively connected to the base station 120. Any suitable communications medium may be employed to establish communications between the MSO 148 and the base station 120, including wireless signals of the wireless network 144.

The MSO 148 may be configured to control several base stations 120 of the wireless network 144. In particular, the MSO 148 may control which base station 120 of the wireless network 144 communicates with a specific wireless device 110. For example, as the wireless device 110 moves between the geographic coverage areas of different cells 140 of the wireless network 144, the MSO 148 is able to maintain connectivity with the wireless device 110 by switching control from one base station 120 to another, which is commonly referred to as a "hand off." As known to those skilled in the art, the MSO 148 may control cell switching in accordance with the strength of cellular signals being provided to the wireless device 110 by different base stations 120, as measured by the wireless device 110 or the base station 120. This type of cell switching is typically performed transparently to a user of the wireless device 110. The MSO 148 may perform cell switching and other known functions, which will be understood by those skilled in the art.

The base stations 120 of the wireless network 144 may forward network status data received from wireless devices 110 to the MSO 148. The base station 120 is able to provide the MSO 148 with network status data over predefined control channels or upstream communication channels of the wireless network 144.

The MSO 148 is able to forward the network status data to the network operations center 150. This may be done using any suitable upstream control or communication channel of the wireless network 144. Alternatively, other media (e.g., land-based lines) may be used to support communications between the network operations center 150 and the MSO 148.

6. SMS Operations Center

As known to those skilled in the art, the short message service ("SMS") operations center 155 is capable of supporting SMS features in the wireless network 144. Users typically use SMS features for sending alphanumeric messages.

The SMS operations center 155 may be further configured to support communications of the network status data from the wireless device 110 to the network operations center 150. This allows the network status data to be transmitted upstream using out-of-band channels.

As shown in FIG. 1, the SMS operations center 155 is communicatively connected to the base station 120. Any suitable communications medium may be employed to establish communications between the SMS operations center 155 and the base station 120.

The base stations 120 of the wireless network 144 may forward network status data received from wireless devices 110 to the SMS operations center 155. The base station 120 is able to provide the SMS operations center 155 with network status data over out-of-band channels typically used for SMS features.

The SMS operations center 155 is able to forward the network status data to the network operations center 150. This may be done using any suitable upstream control or communication channel of the wireless network 144. Alternatively, other media (e.g., land-based lines) may be used to support communications between the network operations center 150 and the SMS operations center 155.

B. GPS Satellites

As is well-known to those skilled in the art, GPS is generally a space-based radio-positioning and time-transfer technology. However, any form of GPS technology may be used in the system 100. In some embodiments, for example, land-based GPS transmitters may be used to augment space-based GPS transmitters. GPS can provide accurate position, velocity, and time coordinates for a given object anywhere on the face of the earth. GPS satellites 180, which are orbiting the earth, produce and transmit the GPS signals 170. More specifically, twenty-four GPS satellites 180, not including spares, move about orbits arranged so that at any time, anywhere on the earth, there are at least four satellites communicatively "visible" to a given geographic position on the earth. The "visible" satellites 180 transmit GPS signals 170, which include information that can be used to determine GPS coordinate data for the wireless device 110.

FIG. 1 illustrates four GPS satellites 180 that are communicatively visible to the wireless device 110. As discussed above, the wireless device 110 is able to receive the GPS signals 170 from the GPS satellites 180 and use the GPS signals 170 to determine GPS coordinate data, as known to those skilled in the art. The system 100 may be equipped to use any known GPS technology, including those that use differential GPS ("DGPS") technology, which can provide improved accuracy of GPS coordinate determinations.

Any of the devices of the wireless network 144 may be equipped to receive GPS signals 170 and transmit GPS data downstream to the wireless device 110 to assist it in accurately determining its GPS data. For example, the system 100 may employ any of the techniques disclosed in U.S. Pat. No. 6,323,803 to Jolley et al., issued Nov. 27, 2001, and entitled SYSTEM AND METHOD FOR INCREMENTAL BROADCAST OF GPS NAVIGATION DATA IN A CELLULAR NETWORK, or U.S. Pat. No. 5,982,324 to Watters et al., issued Nov. 9, 1999, and entitled COMBINING GPS WITH TOA/TDOA OF CELLULAR SIGNALS TO LOCATE TERMINAL, the contents of which are hereby incorporated by reference in their entirety.

C. GPS Signals

The GPS signals 170, which are well-known to those skilled in art, are transmitted from the GPS satellites 180 and may be used to determine GPS data (e.g., position, velocity, and time coordinates) related to the wireless device 110. The GPS signals 170 may include two L-band carrier signals, as understood by those skilled in the art.

While FIG. 1 shows GPS satellites 180 and GPS signals 170 to illustrate the use of a non-cellular-based positioning technology to determine location of the wireless device 110, this is not intended to be limiting. Indeed, the system 100 may use one or more different non-cellular-based positioning technologies for determining parameters (e.g., location, time, and/or velocity coordinates) of the wireless device 110. For example, in some alternative embodiments, the wireless device 110 may be equipped with capabilities for using one or more different forms of navigational satellite systems, such as Galileo, which is known to those skilled in the art.

D. Network Operations Center

The network operations center 150 may be configured to communicate with the wireless device 110 either directly or indirectly. As shown in FIG. 1, the network operations center 150 may be communicatively coupled to the MSO 148 and/or the SMS operations center 155, which are able to communicate with the base station 120 as discussed above. Thus, the network operations center 150 is able to receive the network status data collected by wireless devices 110, as well as transmit commands to the wireless devices 110. Any suitable connection medium or media may be employed to connect the network operations center 150 with other devices of the wireless network 144. For example, the wireless network 144 may provide communication channels between the network operations center 150 and the MSO 148 and/or the SMS operations center 155. Alternatively, other media (e.g., land-based telephone lines) may be used to support communications between the network operations center 150 and devices of the wireless network 144.

While FIG. 1 shows the network operations center 150 as a separate entity, in other embodiments the network operations center 150 may be included as part of the MSO 148, the SMS operations center 155, or other network device.

The network operations center 150 may receive and aggregate the network status data gathered by the wireless devices 110 of the wireless network 144. As the network operations center 150 receives multiple instances of network status data, the data may be aggregated and stored using any known type of data store (not shown), such as one or more databases. This facilitates population of data stores with parameter-based signal strength data associated with wireless devices 110 of the wireless network 144. The parameter-based signal strength data may include location, time, and or velocity coordinates associated with measured signal strengths of wireless devices 110.

The network operations center 150 may be configured to use the network status data to analyze, configure, reconfigure, optimize, and/or otherwise manage the wireless network 144. In particular, the network operations center 150 may be able to perform analysis, simulation, testing, design, and redesign of the wireless network 144. For example, the network operations center 150 may process the network status data to identify locations within the wireless network 144 that have either weak signal strength or no signal at all (i.e., dead spots are identified). Weak signal strength may include any signal strength determined to be lower than a predetermined threshold. The network operations center 150 may similarly be configured to analyze both weak and conforming signal strength measurements based on corresponding GPS data such as location, time, and velocity coordinates. Parameter data associated with signal strength measurements facilitates analyses of signal strength coverage, which analyses may indicate how signal strength is dynamically affected by changes in location, weather, and other factors.

The network operations center 150 may include computer programs (e.g., software applications) capable of outputting the network status data, data derived from the network status data, or representations of the network status data. The output may be in any format helpful for analyzing the wireless network 144. For example, the network operations center 144 may include mapping software, which can be used to generate graphical representations of network status data, such as the graphical representation 200 shown in FIG. 2.

Figure 2:
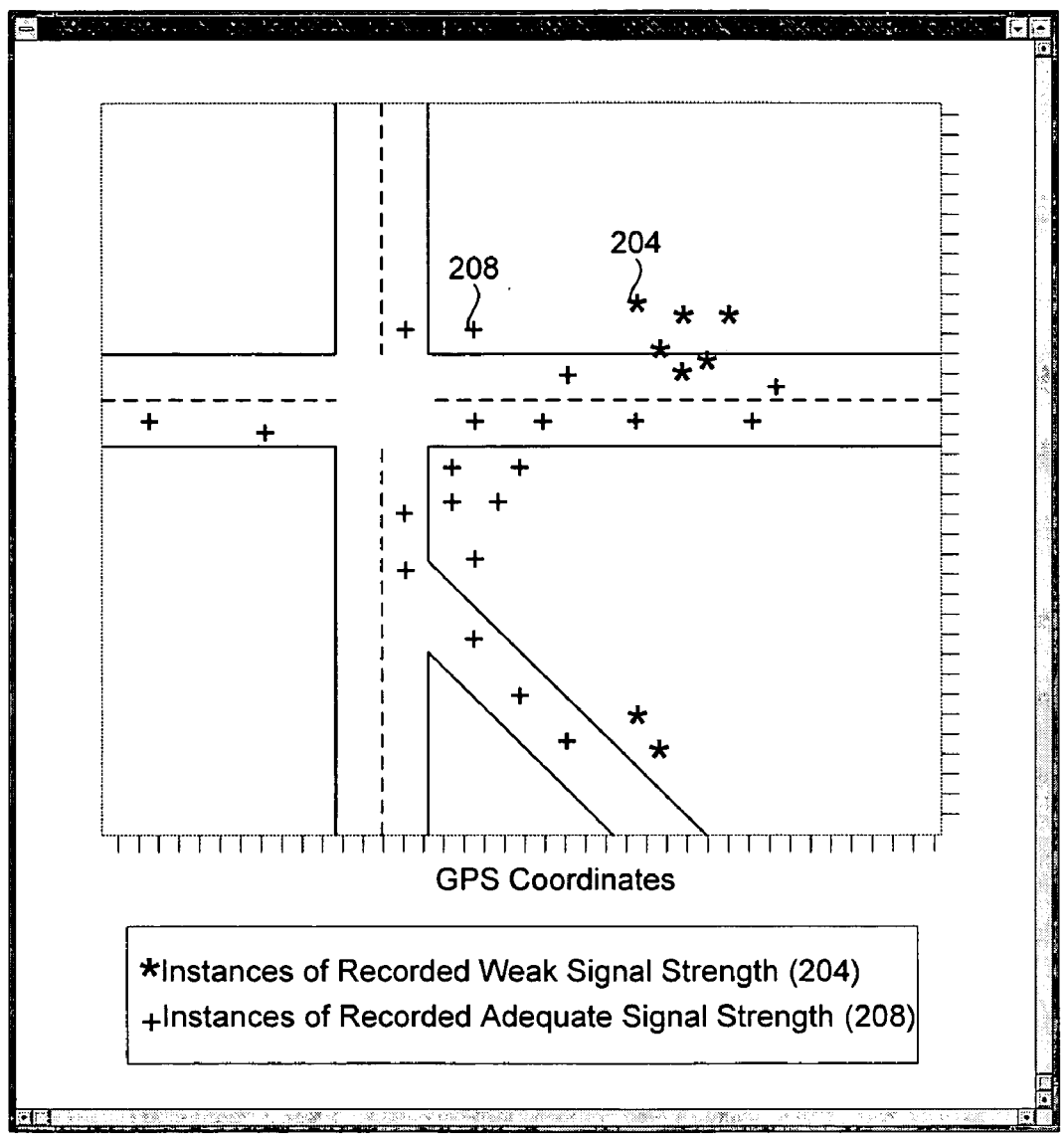
FIG. 2 is an example of a graphical representation of a map of tracked signal strengths within a geographic section of the wireless network of FIG. 1.

The graphical representation 200 of FIG. 2 illustrates signal strength measurements plotted within a geographic section of the wireless network 144 of FIG. 1. The signal strength measurements are plotted based on their corresponding GPS location coordinates, where corresponding means that the GPS coordinates were obtained at approximately the same time that the signal strength was measured. In the graphical representation 200, instances of recorded weak signal strength 204 are identified by the "*" symbol, and instances of recorded adequate signal strength 208 are identified by the "+" symbol. As shown in FIG. 2, the graphical representation 200 may be in the form of a graphical user interface ("GUI").

The graphical representation 200 provides network operators with a highly accurate and intuitive network analysis tool. Network operators are able to use the graphical representation 200 to identify areas of concern within the wireless network 144, such as instances and precise locations of occurrences of weak signal strength (e.g., dead spots). Network operators may reconfigure or optimize the wireless network 144 to correct identified instances and/or locations of weak signal strength. For example, network operators may reconfigure antenna and/or transmitter settings to optimize the wireless network 144, based on location-based signal strength data. Network operators are able to use the data to identify faulty or failing antennae and schedule them for repair. In other embodiments, the system 100 may be configured to automatically adjust network settings based on network status data.

Many variations of the graphical representation 200 may be produced by the network operations center 150 to generate network analysis tools based on the network status data. For example, instances of weak signal strength 204 may be plotted alone, without instances of conforming signal strength 208, and vice versa. By way of another example, recorded instances of signal strength may be plotted based on time in order to illustrate the dynamic nature of signal strength within the wireless network 144. This may help network operators identify any time-based patterns of signal strength within the wireless network 144. For example, the effect of weather conditions on signal strength may be analyzed. With signal strength data plotted based on time, network operators are able to compare current network status data with past and forecast data.

Another analysis approach entails using the network status data to evaluate wireless products. For example, network operators may compare network status data for different makes or models of wireless devices 110 to determine whether particular types of the devices provide better performance than other types within the wireless network 110. Such product analysis may be used to influence future purchasing decisions.

Yet another analysis approach that may be performed by the network operations center 150 involves comparisons of the coverage provided by one carrier with the coverage provided by another carrier, such as a competitor. This allows the network operator to perform market research to identify potentially new market areas. For example, the network status data may be used to identify areas where the frequency spectrum of any carrier's wireless network may be less than adequate to carry demanded traffic volumes. Because the power of RF waves from any source may be readily measured using equipment known to those skilled in the art, the wireless device 110 may be configured to receive and measure RF signals being transmitted by any carrier. Using parameter data (e.g., location data) and signal strength data, the system 100 is able to provide information useful for market comparisons and for analysis of the network coverage provided by different carriers.

The system 100 may be further configured to identify pseudo or merely temporary dead spots. For example, a wireless device 110 may report weak signal strength simply because it is temporarily obstructed by a moveable object (e.g., a large metal object being carried in the vehicle next to the wireless device 110 of a subscriber). The system 100 may recognize such a temporary dead spot in a variety of ways, including comparing network status data for a particular location to network status data gathered for adjacent or proximate locations. In this manner, the system 100 can recognize data that is out of line with other data. As another approach, the system 100 may track data over time to identify any temporary dead spots that may be anomalies caused by temporary circumstances.

While the graphical representation 200 of FIG. 2 shows a two-dimensional plot of signal strength measurements based on GPS coordinates, it is anticipated that three-dimensional GPS coordinate plots may be generated by the network operations center 150. A three-dimensional plot provides an analysis of signal strength as a function latitude, longitude, and altitude. This type of analysis is helpful for tracking signal strength within a multi-story building, on an aircraft, or at any other location that may cause the altitude of wireless devices 110 to vary.

IV. Process Flow Views

Figure 3:
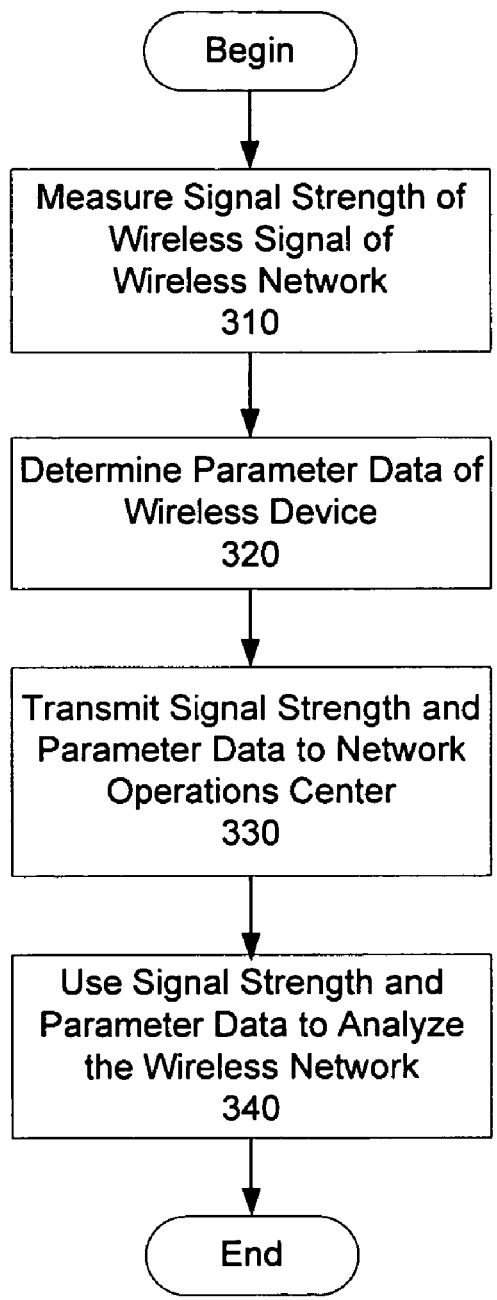
FIG. 3 is a flowchart illustrating an example of a process for tracking signal strength using the system of FIG. 1.

FIG. 3 is a flowchart illustrating an example of a process for tracking signal strength using the system of FIG. 1. While FIG. 3 illustrates exemplary steps according to one embodiment, other embodiments may omit, add to, and/or modify any of the steps shown in FIG. 3.

The process of FIG. 3 begins by measuring the signal strength of wireless signals 130 of the wireless network 144 at step 310. The signal strength may be measured in any of the ways discussed above, including the wireless device 110 measuring the power of downstream wireless signals 130 being received from the base station 120. Step 310 may be initiated in accordance with a predefined schedule or in response to a predetermined event, as discussed above.

At step 320, parameter data of the wireless device 110 is determined. The parameter data may include location, time, and/or velocity coordinates associated with the wireless device 110 at the time of the signal strength measurement. Step 320 may be performed in any of the ways discussed above, including the wireless device 110 using GPS signals 170 to determine GPS coordinate data. Further, step 320 may be initiated by a predefined schedule or a predefined event, as discussed above.

At step 330, the signal strength and parameter data are transmitted to the network operations center 150. Step 330 may be performed in any of the ways discussed above, including using upstream control, communication, or out-of-band channels of the wireless network 144. The signal strength and parameter data, and optionally additional data, may be combined to form network status data, which is transmitted to the network operations center 150 at step 330.

At step 340, the signal strength and parameter data are used to analyze the wireless network 144. The network operations center 150 is able to process the data in any of the ways discussed above, including mapping the signal strength to geographic representations of the wireless network 144, based on the parameter data. A graphical representation of at least a section of the wireless network 144 may be generated to illustrate instances of measured signal strength plotted based on corresponding parameter data. Network operators may use the output of the network operations center 150 to analyze, configure, reconfigure, overhaul, and/or optimize the wireless network, as discussed above.

Figure 4:
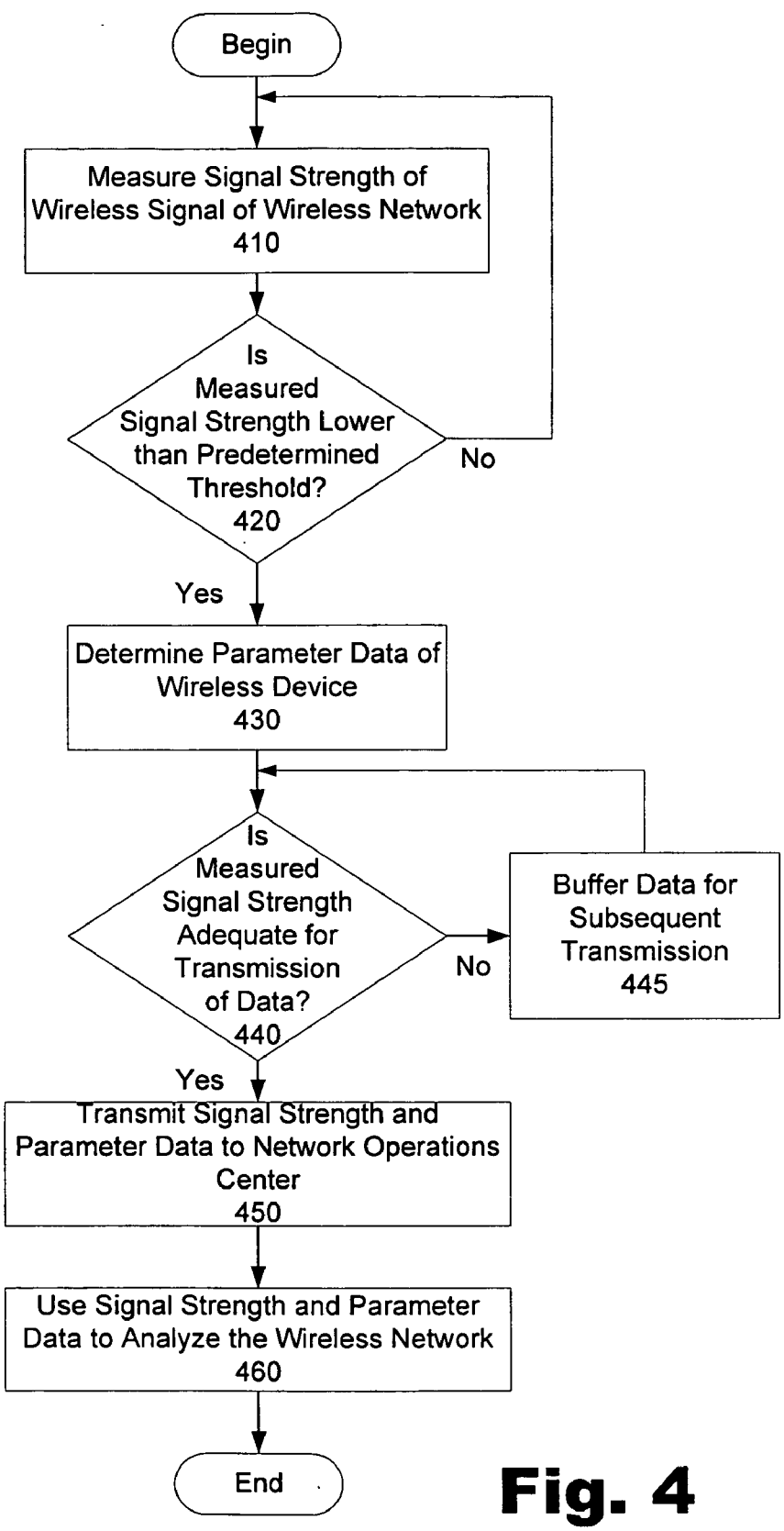
FIG. 4 is a flowchart illustrating another example of a process for tracking signal strength using the system of FIG. 1.

FIG. 4 is a flowchart illustrating another example of a process for tracking signal strength using the system of FIG. 1. While FIG. 4 illustrates exemplary steps according to one embodiment, other embodiments may omit, add to, and/or modify any of the steps shown in FIG. 4.

The process of FIG. 4 begins by measuring the signal strength of wireless signals 130 of the wireless network 144 at step 410. The signal strength may be measured in any of the ways discussed above, including the wireless device 110 measuring the power of downstream wireless signals 130 being received from the base station 120. Step 410 may be initiated in accordance with a predefined schedule or in response to a predetermined event, as discussed above.

At step 420, it is determined whether the measured signal strength is lower than a predetermined threshold. The predetermined threshold may be defined by network operators and may be based on a desired level of signal power that provides effective signal strength. If it is determined at step 420 that the measured signal strength is not lower than the predetermined threshold, the process returns to step 410, at which step another measurement of signal strength is obtained either immediately, according to an established schedule, or in response to a predetermined trigger event.

On the other hand, if it is determined at step 420 that the measured signal strength is lower than the predetermined threshold, the process continues at step 430. At step 430, parameter data of the wireless device 110 is determined. As previously mentioned, the parameter data may include location, time, and/or velocity coordinates associated with the wireless device 110 at the time of the signal strength measurement. Step 430 may be performed in any of the ways discussed above, including the wireless device 110 using GPS signals 170 to determine GPS coordinate data.

At step 440, it is determined whether the measured signal strength is adequate for transmission of data upstream from the wireless device 110 to the base station 120. Step 440 may be performed by comparing the measured signal strength to a predetermined transmission threshold, which may be defined by network operators based on a level of signal power that supports reliable upstream data transmissions from the wireless device.

If it is determined at step 440 that the measured signal strength is inadequate for transmission of data, the process continues at step 445. At step 445, the signal strength and parameter data are buffered for subsequent transmission. Step 445 may be performed by storing the data to memory to maintain the data until it can be transmitted. From step 445, the process returns to step 410 to obtain another measurement of signal strength. Multiple instances of data may be buffered until signal strength becomes strong enough for the stored data to be transmitted upstream from the wireless device 110. In other words, steps 410-440 may be repeated with different measurements being gathered and stored for later transmission when the signal strength becomes strong enough to support upstream transmissions.

If it is determined at step 440 that the measured signal strength is adequate for data transmission, the process continues to step 450. At step 450, the signal strength and parameter data are transmitted to the network operations center 150. Step 450 may be performed in any of the ways discussed above, including using upstream control, communication, or out-of-band channels of the wireless network 144. The signal strength and parameter data, and optionally additional data, may be combined to form network status data, which is transmitted to the network operations center 150 at step 450.

At step 460, the signal strength and parameter data are used to analyze the wireless network 144. The network operations center 150 is able to process the data in any of the ways discussed above, including mapping the signal strength to geographic representations of the wireless network 144, based on the parameter data. A graphical representation of at least a section of the wireless network 144 may be generated to illustrate instances of measured signal strength plotted based on corresponding parameter data. Network operators may use the output of the network operations center 150 to analyze, configure, reconfigure, overhaul, and/or optimize the wireless network, as discussed above.

V. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. For example, while cellular-based embodiments have been described above, other embodiments may be implemented in other types of wireless networks.

Further, the preceding description is not intended to limit the invention to any particular applications. The invention may be implemented in applications other than those specifically explained and illustrates. For example, the network operations center 150 may "ping" a wireless device 110 in order to determine its location for law enforcement purposes, in response to a valid court order. The gathered location information could be provided to law enforcement officials either immediately for real-time observation or later for use in determining the travels of the subject person.

Another law enforcement application may entail using the system and method described above to support home incarceration and/or parole orders as used by many governmental agencies as an alternative to placing a person in jail or prison. A wireless device 110 either owned by or provided to a person could be periodically "pinged" to determine the location of the wireless device 110. The determined location could be compared to the permissible locations allowed the person. The system 100 could further verify whether the person subject to home incarceration or parole is in possession of the wireless device 110. For example, the system 100 may initiate a telephone call to the wireless device 110 and use known voice-recognition techniques to compare the voice of the person who answers the telephone call with a voiceprint of the person subject to home incarceration or parole to check the true identity of the person operating the wireless device 110.

It is intended that the scope of the invention be defined by the following claims.

What is claimed is:

1. A wireless device comprising:
a radio-frequency (RF) subsystem configured to transmit and receive RF signals over a wireless network; and
a processing and control subsystem coupled to the RF subsystem and configured to
receive a schedule from the wireless network, wherein the received schedule initiates a ping over the wireless network;
obtain a measurement of signal strength of a wireless signal received by the RF subsystem, wherein obtaining the measurement is performed based on the ping initiated by the received schedule;
determine a current approximate location of the wireless device;
determine an approximate time at which the measurement of signal strength is obtained; and
cause the RF subsystem to transmit signals representative of the measured signal strength, the location, the time, and a device identifier to a network operations center over the wireless network.

2. The wireless device of claim 1, wherein transmitting includes sending said signals representative of the measured signal strength, the location, the time, and the device identifier over either at least one upstream control channel or at least one out-of-band channel of the wireless network.

3. The wireless device of claim 1, wherein said signals representative of the measured signal strength and the at least one determined parameter are transmitted out-of-band by using at least one short message service ("SMS") channel.

4. The wireless device of claim 1, further comprising:
a location determination subsystem coupled to the processing and control subsystem and configured to determine location data indicating a location of the wireless device;
wherein the processing and control subsystem is further configured to instruct the location determination subsystem to obtain location data, receive the location data from the location determination subsystem, and use the location data in determining the current approximate location of the wireless device.

5. The wireless device of claim 4, wherein the location determination subsystem comprises a GPS system.

6. The wireless device of claim 1, wherein the device identifier includes at least one characteristic of the wireless device, including a make, a model, and an operating mode.

7. The wireless device of claim 1, wherein the processing and control subsystem is further configured to determine the current approximate location of the wireless device by first attempting to gather GPS data, and when GPS data is unavailable, then determining the approximate location using a cellular-based trilateration technique.

8. The wireless device of claim 1, wherein the processing and control subsystem is further configured to cause the RF subsystem to transmit signals representative of the measured signal strength, the location, the time, and the device identifier to the network operations center at approximately the same time that the signal strength is measured.

9. The system of claim 1, wherein the ping is transmitted to the wireless device over at least one control channel.

10. The system of claim 1, wherein the ping is initiated by the network operations center.

11. The system of claim 1, wherein the ping is initiated based on a predefined event.

12. A method comprising:
   selecting a plurality of wireless devices;
   sending a command over a wireless network to the plurality of wireless devices, wherein the command includes a schedule for initiating a ping over the wireless network;
   each of the plurality of wireless devices performing the following in response to receiving the ping initiated by the predefined schedule:
      measuring a signal strength of downstream wireless signals,
      determining a current approximate location of the wireless device,
      determining an approximate time at which the measurement of signal strength is obtained, and
      sending a signal including the measured signal strength, the location, the time, and a device identifier to a network operations center over the wireless network; and
   performing an analysis based on the received data.

13. The method of claim 12, wherein the analysis includes mapping the measured signal strength to at least a section of a geographic area covered by the wireless network.

14. The method of claim 13, wherein the analysis further includes mapping the measured signal strength based on both the identified location and the approximate time.

15. The method of claim 13, further comprising:
   generating a graphical representation of at least a section of a geographic area covered by the wireless network; and
   plotting each measured signal strength on said graphical representation, based on the identified location.

16. The method of claim 12, further comprising reconfiguring the wireless network based on the analysis, wherein reconfiguring includes at least one of optimizing a position of at least one antenna based on the analysis and scheduling maintenance of at least one antenna based on the analysis.

17. The method of claim 12, wherein said signal is sent over at least one out-of-band channel of the wireless network.

18. The method of claim 12, wherein selecting the plurality of wireless devices is based on at least one of a geographic location, a service provider, and a wireless device characteristic.

19. The method of claim 18, wherein the wireless device characteristic includes at least one of a make, a model, and an operating mode.

20. The method of claim 12, wherein each of the plurality of wireless devices is further configured to determine the current approximate location of the wireless device by first attempting to gather GPS data, and when GPS data is unavailable, then determining the approximate location using a cellular-based trilateration technique.

21. The method of claim 12, further comprising transmitting the ping to the wireless device over at least one control channel.

22. The method of claim 12, further comprising sending the ping in response to a schedule provided by the network operations center.

23. The method of claim 12, further comprising sending the ping in response to a predefined event.

24. A system comprising:
   a network operations center communicatively coupled to a plurality of wireless devices, said network operations center being configured to:
      select a subset of said plurality of wireless devices,
      send a command over a wireless network to said subset of said plurality of wireless devices, wherein the command includes a schedule for initiating a ping over the wireless network,
      receive data in response to said ping initiated by said schedule, and
      analyze said received data; and
   at least one wireless device configured for operation in a wireless network, said wireless device being configured to:
      receive said ping from said network operations center via said wireless network;
      measure a signal strength of downstream wireless signals received by said wireless device, wherein measuring said signal strength is performed in response to receiving said ping;
      determine a current approximate location of said wireless device,
      determine an approximate time at which said measurement of signal strength is obtained, and
      transmit signals representative of said signal strength, said location, said time, and a device identifier to said network operations center upstream over said wireless network.

25. The system of claim 24, wherein said network operations center is configured to map said signal strength to at least a section of a geographic area covered by the wireless network, based on said location.

26. The system of claim 24, wherein said network operations center is configured to:
   generate a graphical representation of at least a section of a geographic area covered by the wireless network; and
   plot said signal strength to said graphical representation, based on said location.

27. The system of claim 24, wherein said network operations center is further configured to
   generate a graphical representation of at least a section of a geographic area covered by the wireless network; and
   plot said signal strength to said graphical representation, based on said location and said time.

28. The system of claim 24, wherein said wireless device includes global positioning system ("GPS") capabilities to receive GPS signals from GPS satellites and to determine said current approximate location using said GPS signals.

29. The system of claim 28, wherein said wireless device is further configured to determine said current approximate location of said wireless device by first attempting to gather GPS data, and when GPS data is unavailable, then determining said approximate location using a cellular-based trilateration technique.

30. The system of claim 24, wherein said wireless device is configured to transmit said signals representative of said signal strength, said location, said time, and said device identifier to said network operations center using at least one upstream control channel or at least one out-of-band channel of the wireless network.

31. The system of claim 24, wherein said device identifier includes at least one characteristic of said wireless device, including a make, a model, and an operating mode.

32. The system of claim 24, wherein said ping is transmitted to said wireless device over at least one control channel.

33. The system of claim 24, wherein said ping is initiated by said network operations center.

34. The system of claim 24, wherein said ping is initiated based on a predefined event.

* * * * *